Figure 1:
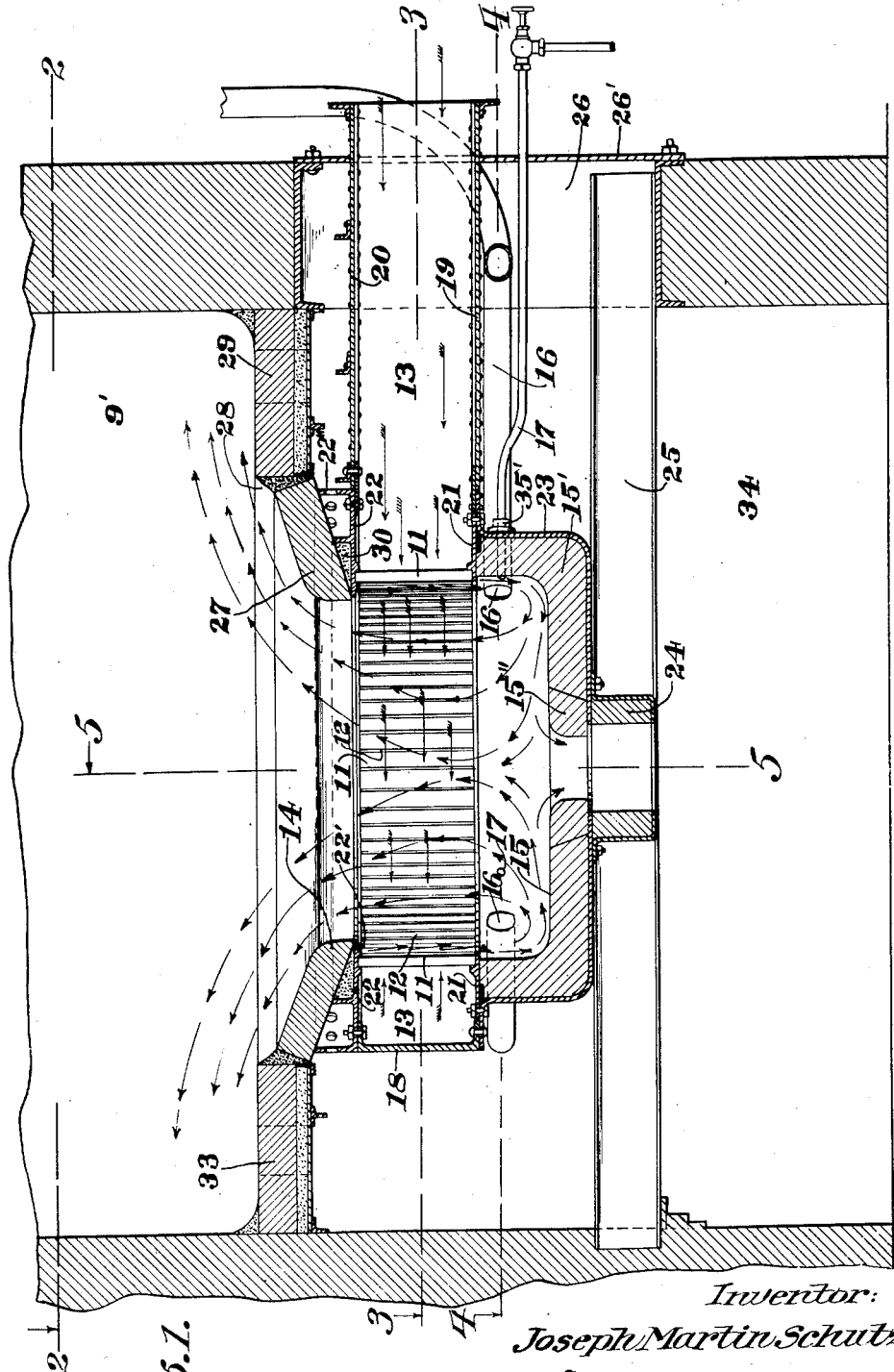

Jan. 31, 1928.  1,657,725
J. M. SCHUTZ
FUEL BURNER
Filed Sept. 6, 1923   10 Sheets-Sheet 1

Inventor:
Joseph Martin Schutz.
By [signature]
Attorney.

Jan. 31, 1928.　　　　　　　J. M. SCHUTZ　　　　　　　1,657,725
FUEL BURNER
Filed Sept. 6, 1923　　　　10 Sheets-Sheet 4

Inventor:
Joseph Martin Schutz
By　　　　　　　
Attorney.

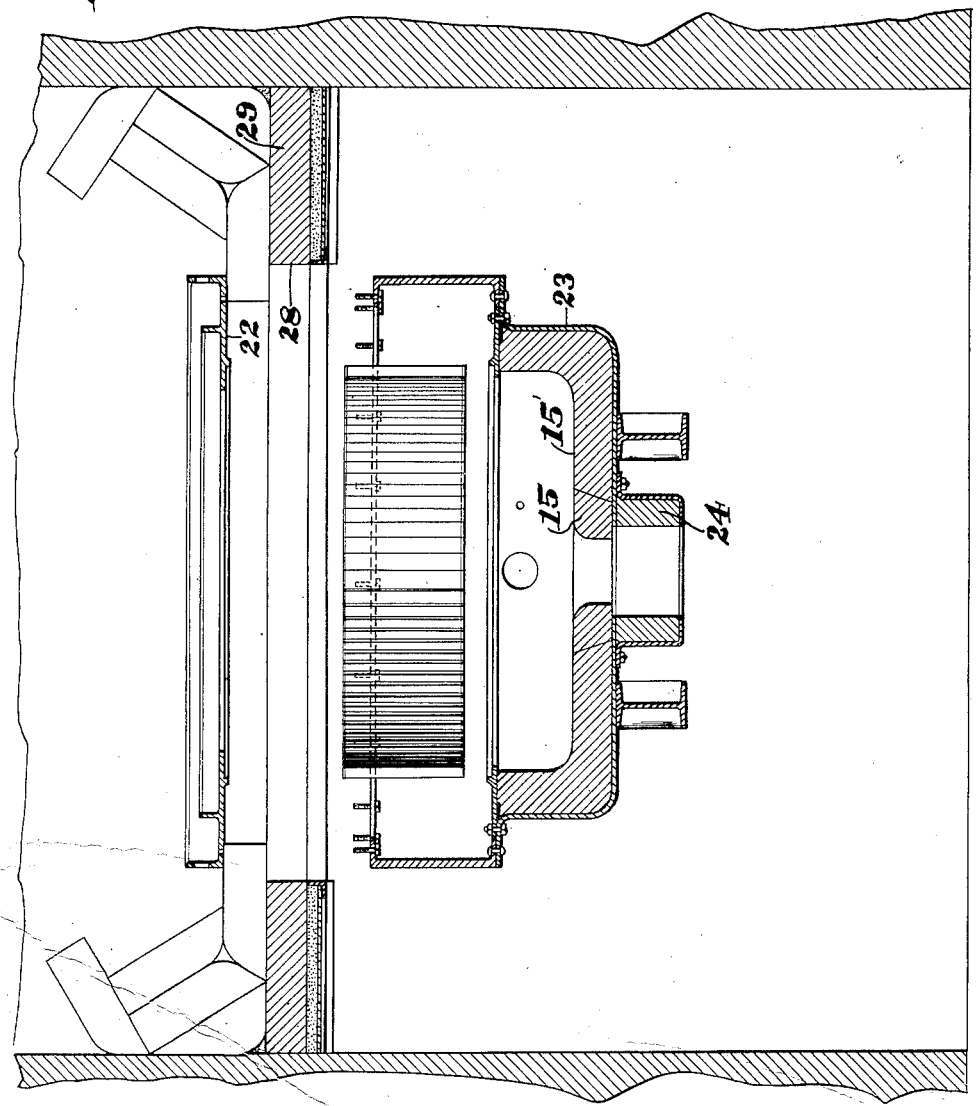

Jan. 31, 1928.
J. M. SCHUTZ
1,657,725
FUEL BURNER
Filed Sept. 6, 1923 10 Sheets-Sheet 6
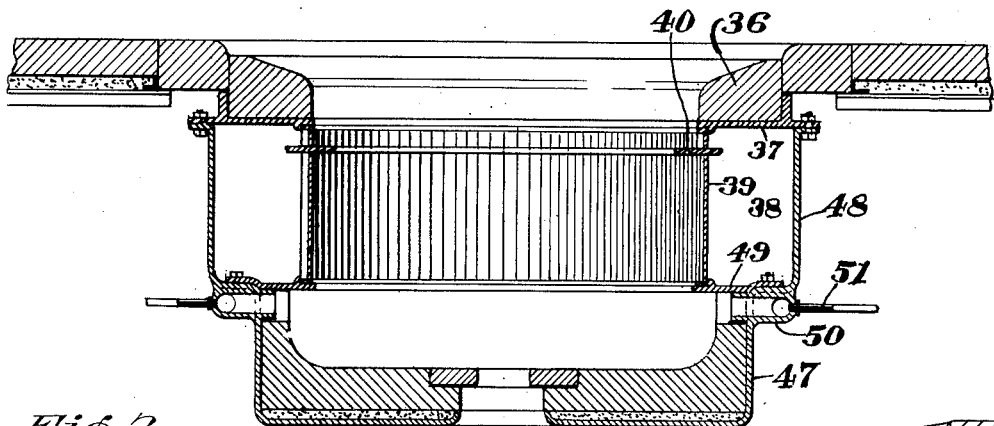
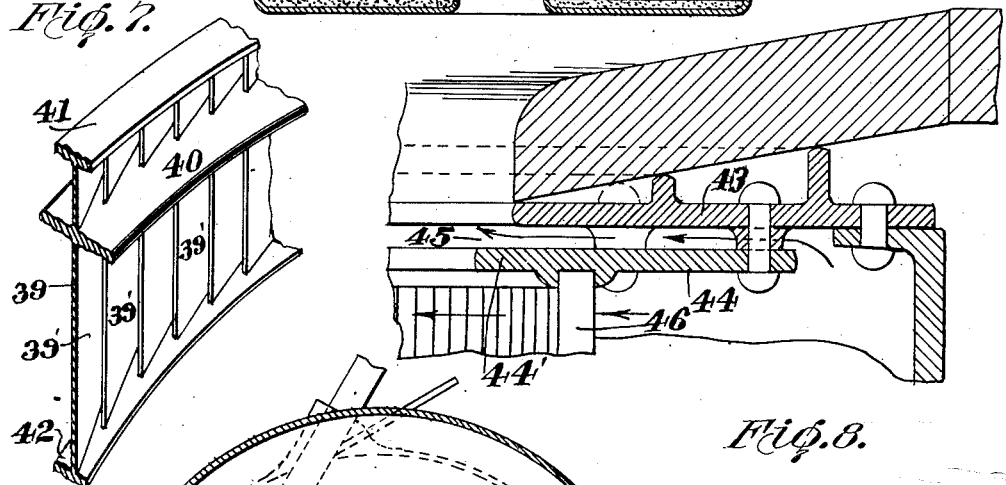
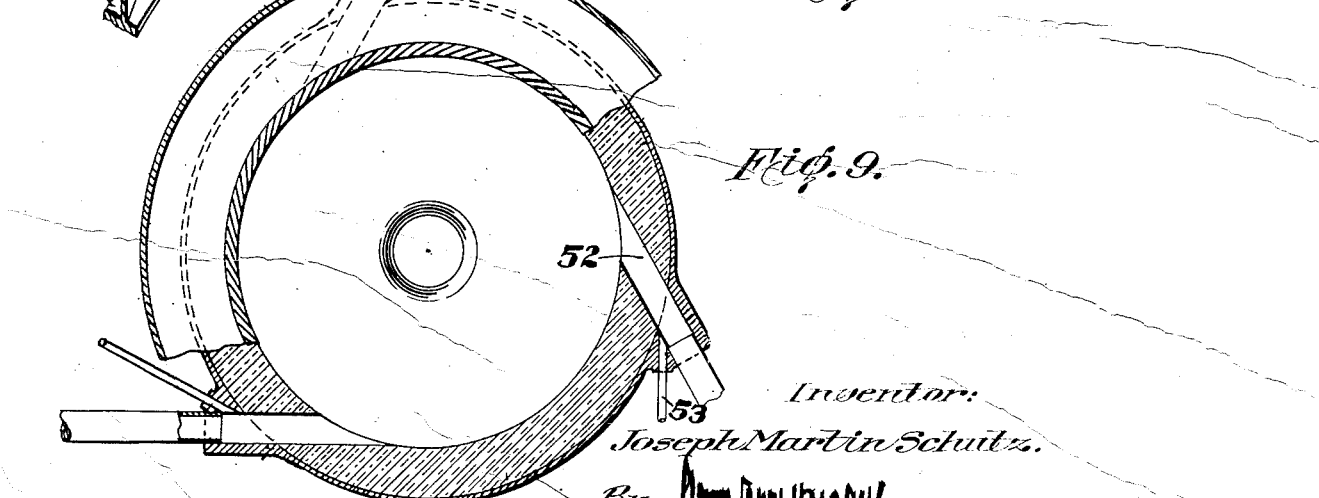
Inventor:
Joseph Martin Schutz.
By
Attorney.

Jan. 31, 1928. 1,657,725
J. M. SCHUTZ
FUEL BURNER
Filed Sept. 6, 1923 10 Sheets-Sheet 7
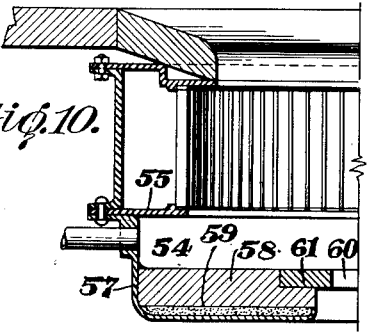
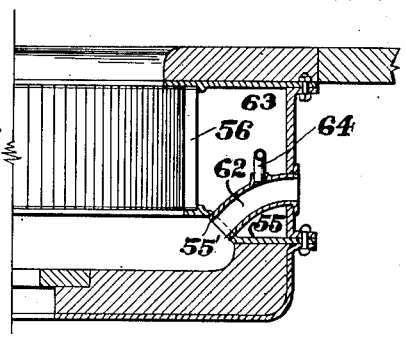
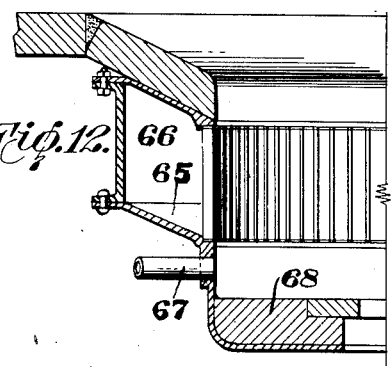
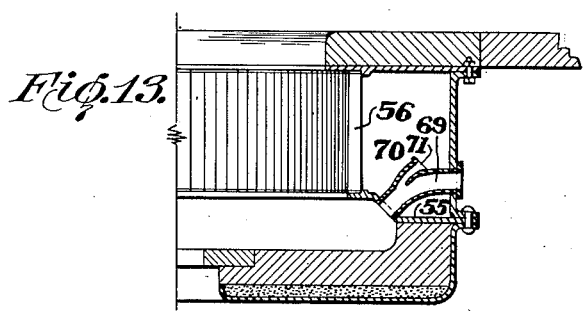
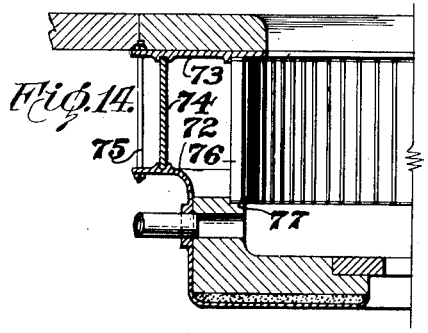
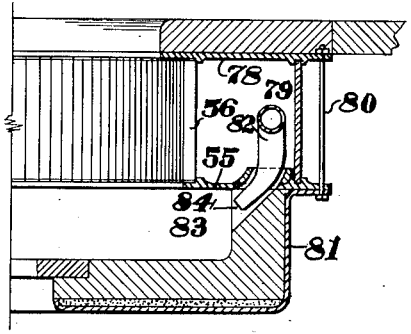
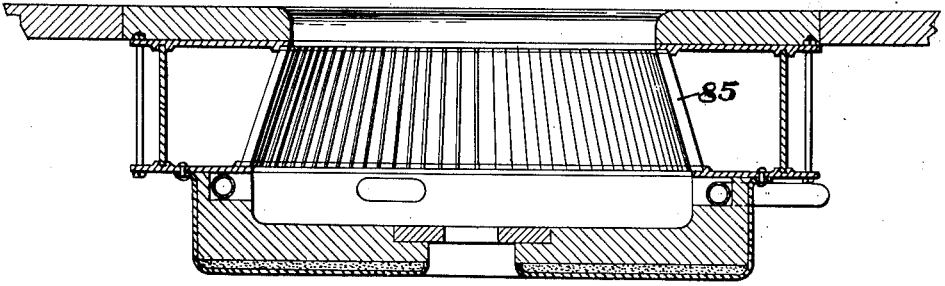
Inventor:
Joseph Martin Schutz.
By
Attorney.

Fig.17.
Fig.18.
Fig.19.
Fig.20.
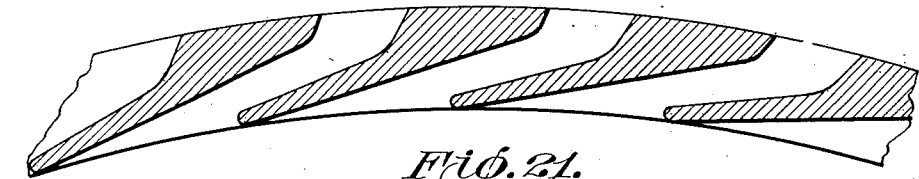
Fig.21.
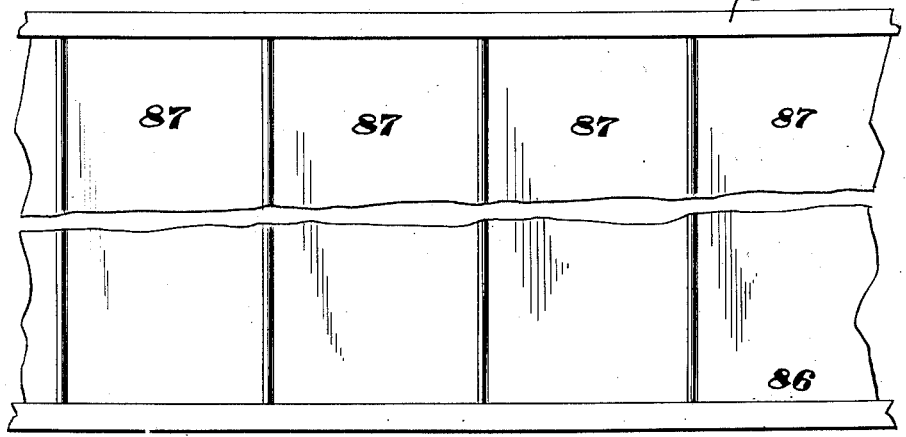
Inventor:
Joseph Martin Schutz.
By 
Attorney.

Jan. 31, 1928.　　　　　　　　　　　　　　1,657,725
J. M. SCHUTZ
FUEL BURNER
Filed Sept. 6, 1923　　　10 Sheets-Sheet 9

Inventor:
Joseph Martin Schutz.
By
Attorney.

Jan. 31, 1928.
J. M. SCHUTZ
1,657,725
FUEL BURNER
Filed Sept. 6, 1923   10 Sheets-Sheet 10
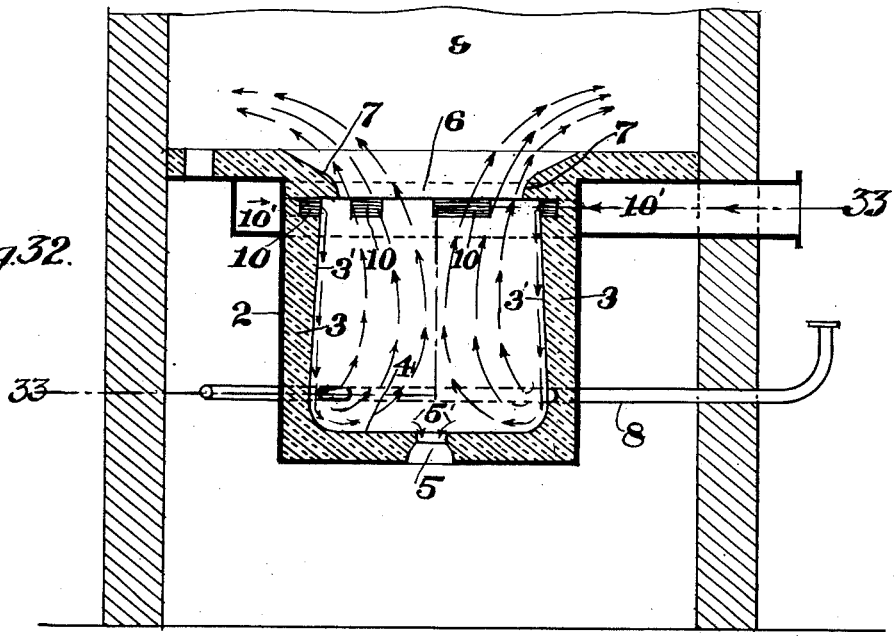
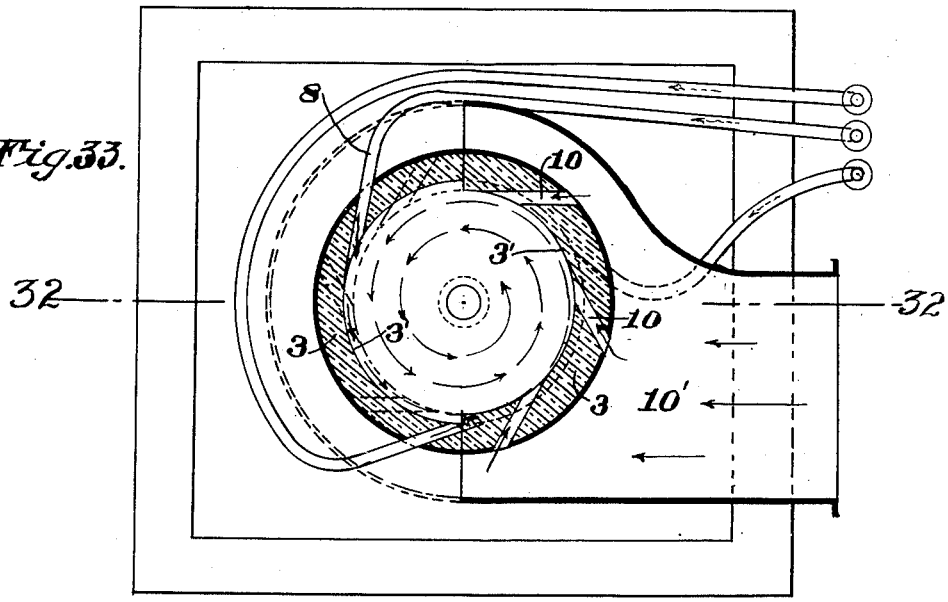
INVENTOR
Joseph Martin Schutz
BY
ATTORNEY Patented Jan. 31, 1928.

1,657,725

UNITED STATES PATENT OFFICE.

JOSEPH MARTIN SCHUTZ, OF CHICAGO, ILLINOIS, ASSIGNOR, BY MESNE ASSIGNMENTS, TO CHARLES GILBERT HAWLEY, OF CLEVELAND, OHIO.

FUEL BURNER.

Application filed September 6, 1923. Serial No. 661,164.

My invention relates to burners or furnaces for the combustion of fuels, and has special reference to the burning of pulverized or comminuted coals of all kinds, ranging from wood and peat, through the lignite and bituminous groups, and including cokes and anthracite coals.

My purpose in this invention is to provide a simple, safe, efficient and easily controlled fuel burner for the rapid production of heat at high temperatures; and, a particular object is to structurally improve and to ensure the better working of the introgenerative furnace that is described and claimed in Patent No. 1,306,234 of June 10, 1919. It will presently become apparent that the old and the new burners or furnaces have much in common. Both comprise an upright annulus or burner proper that is open at the top, and which is closed at the bottom save for a comparatively small slag discharge opening.

In the older process and apparatus both the air and the fuel are introduced tangentially at the top of the annulus and whirl against the inner walls thereof, and downward toward its bottom, meantime taking fire, the products ultimately reacting and returning upwardly along the central axis, the flame rising from the lower part of the annulus and discharging through its open top.

In my present improvement only the air is introduced tangentially at the top of the annulus or burner. The coal is introduced close to the bottom, or as I herein call it, the circular hearth of the burner. The active combustion is initiated on such bottom or hearth and is there completed to the point of fuel decomposition and the melting out or separation of the fuel ash.

In form, the resultant fire is much the same as that derived from the patented furnace, but is greatly accelerated and intensified; and is sharply localized on the bottom or hearth of the annulus by means which bring about the pre-heating of the entering air to very high temperature before it reaches the fuel particles in the burner. This pre-heating of the air, I accomplish within the burner itself, and chiefly through the employment of novelly positioned and constructed tangential air twyers.

The whirling of the air and gases on the hearth very definitely holds back the particles of coal and coke from the central ash opening, allowing only the liquefied ash to discharge therefrom; and also plays an important part in respect to the spreading and control of the entering air and in respect to the discharging flame.

In this invention, as contrasted with the old, the whirling column of air which drives downward from the tangential air twyers is relieved from the duty and burden of spreading and holding the fuel particles on the vertical walls of the annulus, leaving said walls free to perform, in conjunction with the outgoing central body of flame, the new and important office of preheating the supplied air to a temperature approximating that of the flame. And thus before the air reaches the fuel on the hearth it is preheated to a temperature so high as to ensure the almost instantaneous combustion of the fuel at the moment of admixture therewith; markedly hastening the performance of the complete process; or reversely, greatly increasing the capacity of a burner or annulus of given size.

A special object of my invention is to so improve the burner or furnace that it may be made of relatively small diameter and proportionately of less depth than my formerly invented burner or furnace and yet develop a more reliable action and a greater capacity. Still further objects and features of the invention will appear hereinafter.

Figure 2:
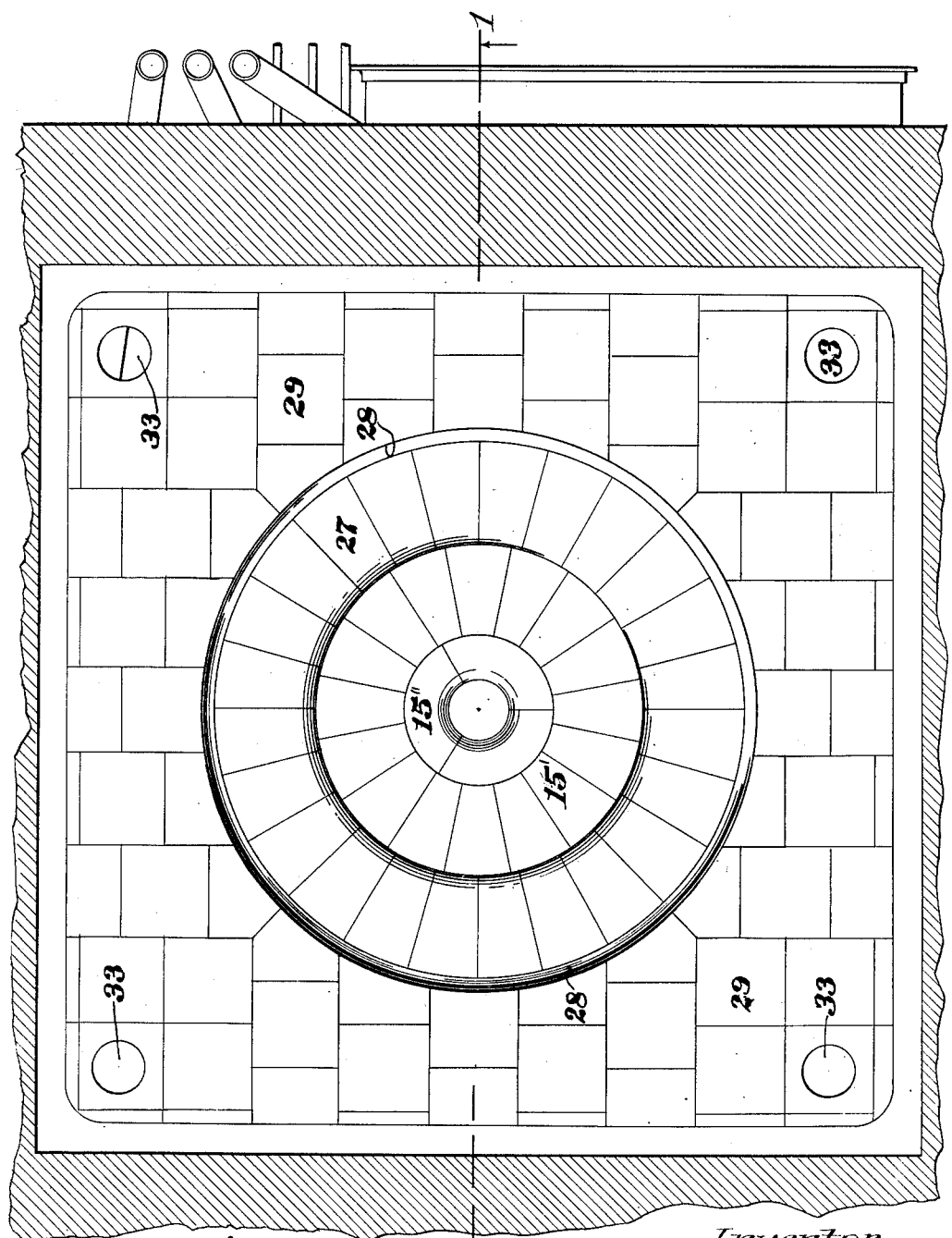
Figure 3:
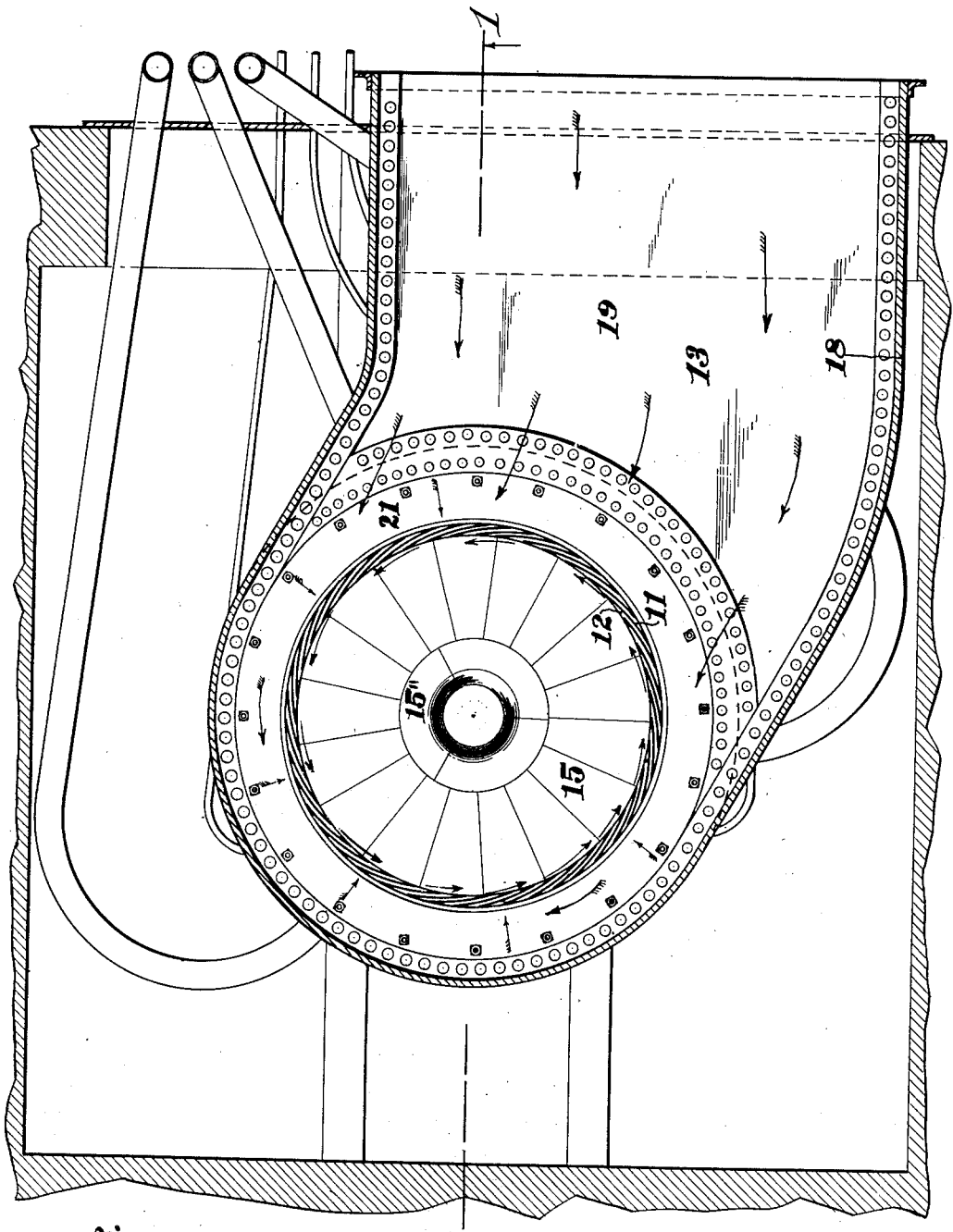
Figure 4:
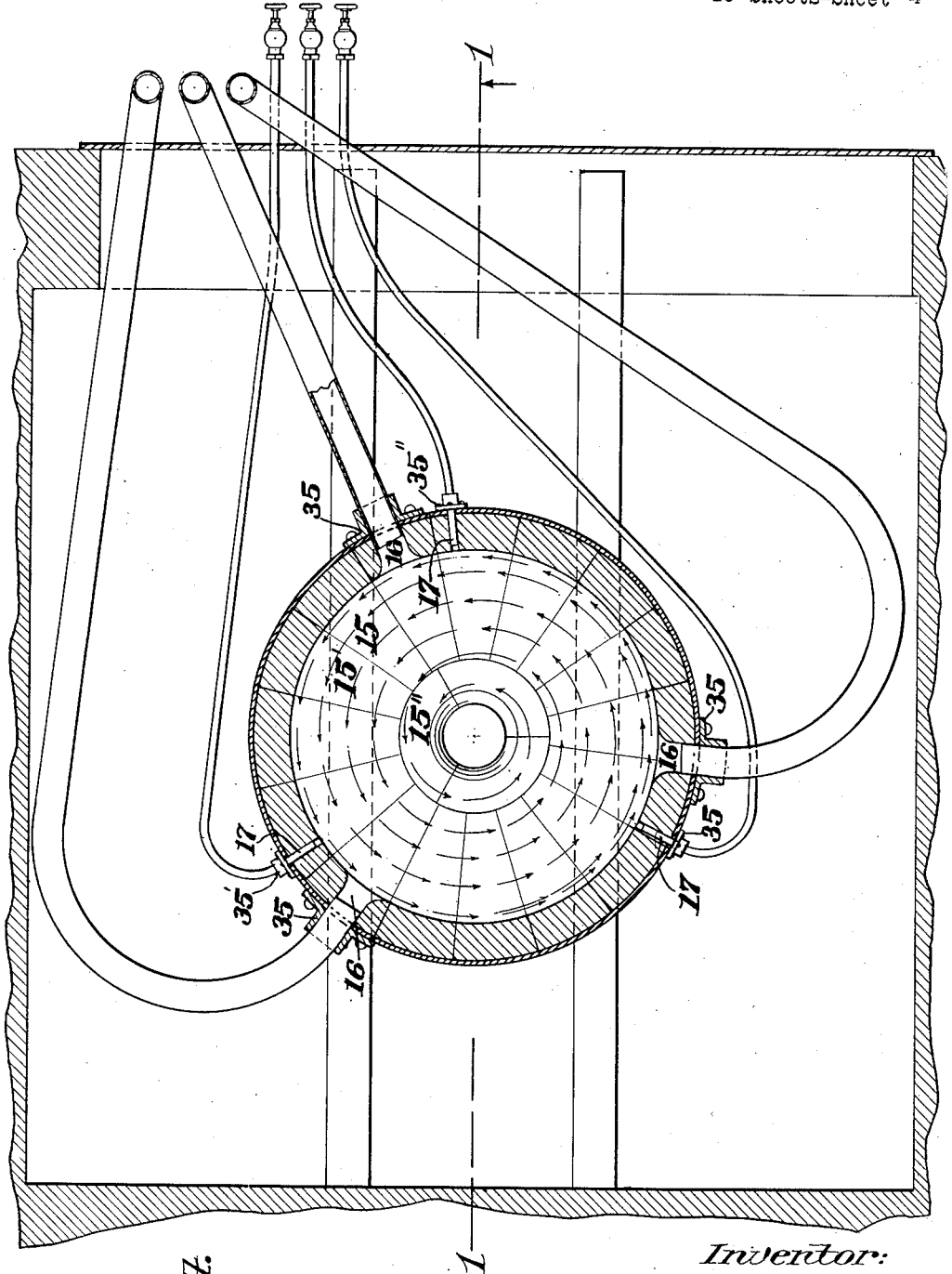
Figure 22:
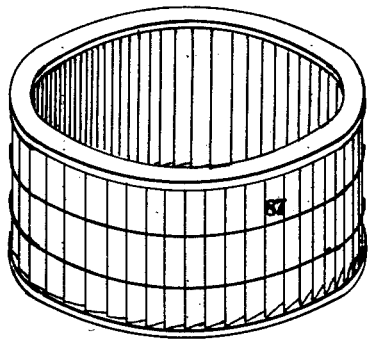
Figures 23, 24, 25, 26, 27:
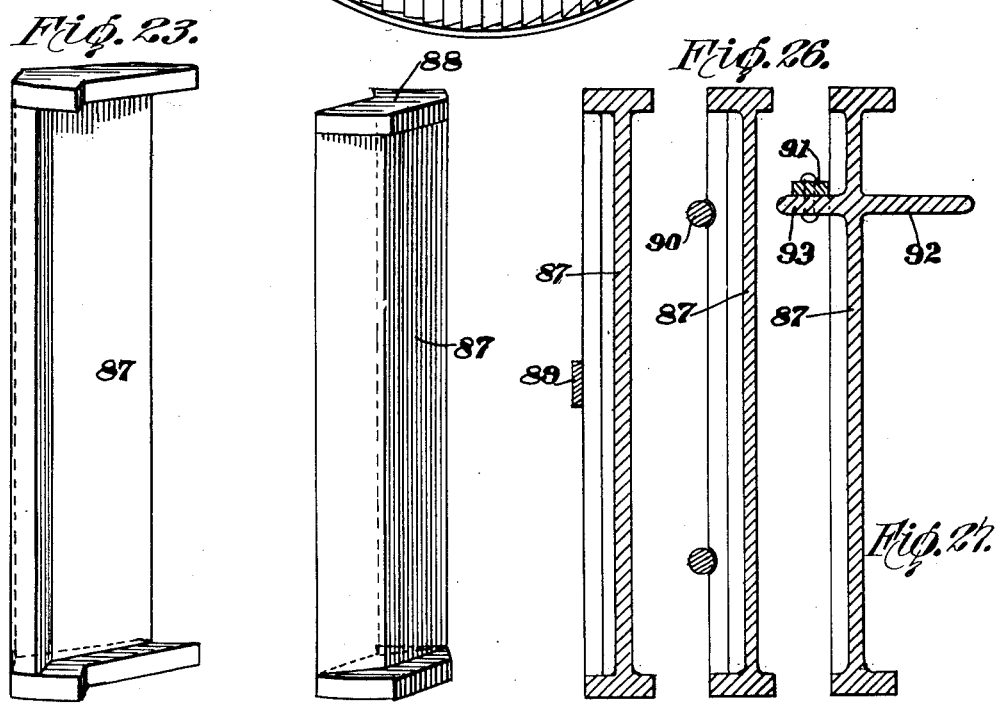
Figure 28:
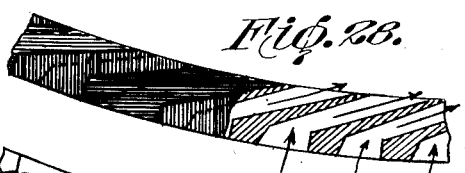
Figure 30:
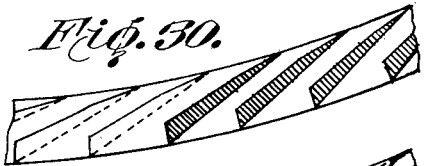
Figure 29:
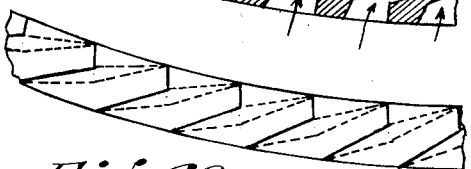
Figure 31:
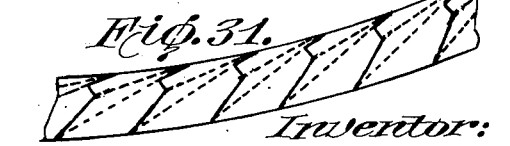

My invention will be readily understood on reference to the following detailed description and the accompanying ten sheets of drawings. In the latter, Fig. 1 is a vertical section of a fuel burner embodying my invention positioned in a fire chamber, the section being on the line 1—1 of Figs. 2, 3 and 4; Fig. 2 is a horizontal section on the line 2—2 of Fig. 1; Fig. 3 is a horizontal section on the line 3—3 of Fig. 1; Fig. 4 is a horizontal section on the line 4—4 of Fig. 1; Fig. 5 is like unto Fig. 1 but shows the burner partly taken apart, as in the act of assembling or of separating the chief parts thereof; Fig. 6 is a vertical section illustrating a form of the furnace, modified as to the shape of its air twyers and its hearth; Fig. 7 is an enlarged perspective view of a portion of the air twyer ring taken from Fig. 6; Fig. 8 is a still further enlarged sectional detail, illustrating a modified device for introducing air above the abutment ring or ledge of the burner; Fig. 9 is a compound horizontal section of one of my burners, illustrating the employment of tangentially disposed fuel twyers; Figs. 10 to 16 inclusive are sectional views illustrating my novel burner or furnace in still further forms, each modified in one or more features of importance with respect to the work to be done by the burner; Figs. 17 to 21 are enlarged sectional details of various forms of the air twyer ring, which is an important element of my invention; Fig. 21 is intended to represent the appearance of the inner face of the air twyer ring; Fig. 22 is a perspective view better illustrating the air twyer ring in its entirety; Figs. 23 and 24 are perspective views of twyer blades or vanes of two different forms, many of which are used in interlocking relation to constitute a complete twyer ring; Figs. 25 to 27 represent various vertical cross sections of the twyer blades and three different devices for binding the blades together in ring formation; Figs. 28 to 31 inclusive are horizontal details, illustrating four of the many shapes in which the twyer blades or vanes and their heads or ends may be made; Fig. 32 is a vertical cross section of my burner in simplified form, the section being on the line 32—32 of Fig. 33; and, Fig. 33 is a horizontal section thereof on the irregular section line 33—33 of Fig. 32.

The novel improvement in the art of combustion, which may be carried out with burners of the constructions herein depicted will be described in conjunction therewith, but such process is not herein claimed, for it is separately described and claimed in my companion application entitled "Art of burning fuel", of even date herewith, to wit, Serial No. 661,163 filed September 6, 1923.

Referring first to the simplified burner of Figs. 32 and 33, the vertically disposed annulus or burner will be seen to be substantially circular in horizontal cross section. It is preferably composed of a refractory material such as fire brick, and, is preferably constructed within and protected by an imperforate metal shell 2. The annulus proper comprises the operatively circular and cylinder wall 3, plus the bowl-like bottom or hearth 4, before mentioned. The slag discharge hole 5 is located at the center of the hearth. 6 represents the large flame discharge opening at the top of the annulus. The only real top portion that the annulus need have comprises the overhanging air-abutment ledge or ring 7, preferably also of refractory material.

Directly above the hearth 4, I introduce the comminuted or pulverulent coal or other fuel to be burned, using by preference a plurality of twyers 8 or supply pipes for the purpose. For sake of clearness, and it being understood that the comminuted fuel may be easily introduced through the agency of air blasts, I have shown the twyers 8 in tangential relation to the periphery of the hearth. Thus positioned the twyers have an initial effect in circumferentially distributing or spreading the fuel on the hearth, but the fuel may be introduced radially through the walls of the hearth or in any other desired manner, for as hereinafter explained the force of the whirling supply of combustion supporting air is amply sufficient to uniformly distribute the fuel particles about the periphery of the hearth. Most conveniently the hearth takes the form of a shallow bowl which has sufficient height to let the fuel through openings slightly above the floor of the hearth, where the fuel ash is liberated and liquefied. When the process is in full operation the particles of fuel fall from the twyer openings and virtually float upon the film of liquid ash always present on the hearth.

In some cases a part of the air required for the combustion of the fuel may be introduced into the fire chamber 9 above the burner, such air feed being determined according to the kind of fuel burned and the degree of combustion required in the burner. The air required for the degree of combustion desired within the burner is introduced through the air feed twyers 10. It is introduced in such manner as to form a downwardly moving and rapidly whirling hollow column which through centrifugal force substantially adheres to the inner wall surface 3' of the burner.

The air enters the burner under a pressure considerably greater than that in the fire chamber 9 and its introduction in the whirling manner described may be accomplished in various ways and by various means. The simplest means comprise the overhanging ledge or abutment ring 7 and a plurality of tangential air twyers 10 which penetrate the wall of the burner directly beneath the ledge 7. The pressure air, in the structure illustrated, is supplied from a suitable source through the pressure trunk 10' and thus freely enters all of the twyers 10 with substantially uniform pressure and velocity. Entering thus, the streams of air from the twyers encounter the upright wall surface 3' of the burner and the centrifugal force set up causes the streams to press against that wall. As egress upwardly is blocked by the abutment ledge 7, the whirling blasts of air are forced to descend toward the bottom of the burner, describing spiral paths that may be likened to the low-pitched threads of a screw. Thus the air supplied for the combustion of the fuel is forced to make many turns within the burner and to travel from top to bottom thereof before coming in contact with the fuel on the hearth. It being understood that the mixture of fuel is ignited within the burner, it will also be understood that very quickly a rotating flame of large volume and great intensity is generated and continuously maintained on the bottom of the burner and at its axis. That bottom being closed, the flame of necessity finds escape at the top of the burner through the large opening 6. The whirling motion of the air and gases within the burner is depicted by the spirally formed set of arrows in Fig. 33. The downward sweep of the whirling column of air within the burner and the upward whirling sweep of the flames and gaseous products of combustion are well represented by the two sets of arrows in Fig. 32. The upward and downward whirling of the flames and gases at the mouth or top of the burner, is caused by the terrific whirling of the products within the burner, which whirling and resultant centrifugal action, persists as the flame emerges from the top of the burner.

Having thus visualized the presence of combustion and the action of the upwardly moving body of flame within the burner, it will now be apparent that the freshly entering air from the twyers 10 in its downward progress moves circularly a comparatively great distance upon the intensely hot vertical walls of the burner and that throughout such travel the thin layer of air is directly in the presence of and exposed to the central body of the flame. Some of the supplied air doubtless more or less directly enters into combination with the richer products of combustion upon the exterior of the whirling central body of flame, but the greater quantity continues to the bottom and receives a full quota of heat both from the combustion going on in the burner and the hot walls. Hence for all practical purposes it may be said that before it reaches the bottom of the burner the air is heated almost to the temperature of the flame itself. It follows that the fuel particles attacked by air at such temperatures are consumed almost instantantly, passing through all of the stages of decomposition and combination with almost explosive rapidity at the bottom of the burner or furnace. Obviously the walls of the burner normally are kept at a white heat, incandescent, and in the presence of these walls and the direct heat of the combustion, the freshly entering fuel is brought to a high temperature before the highly preheated air is admixed therewith. In this manner and through these two effects the combustion is caused to take place with extreme rapidity and taking place within the limited confines of the burner, results in temperatures which ensure the uniform continuity of the combination even under widely varying feeds of air and fuel. Further, the closely localized combustion at these temperatures ensures the fusing and liquefying of the incombustible solids or ash of the fuel, resulting in its complete separation from the combustibles. Due to its weight and viscosity the molten ash, or as it should now be termed, the slag, adheres to the floor of the hearth and as it accumulates, flows to the center of the burner and discharges through the central opening 5.

Attention is called to the small arrows 5' in Fig. 32. These are intended to represent the working of the burner or furnace at such internal pressure as will cause a slight lapping downward of flame at the margin of the slag hole, this being done to avoid the possibility of the chilling of the slag thereon, which if permitted would ultimately close the opening and require a new opening to be punched or made at the center of the hearth. The operation of the burner at such internal pressures may be disregarded when the slag opening communicates with a tightly closed chamber that prevents an upward flow of cold air through the slag opening. Such a flow would chill or solidify the slag and is to be avoided.

My invention comprehends the varying of the distance between the air twyers and the coal twyers to either increase or decrease the time of the exposure of the air to the preheating action of the burner walls and its contents of flame. It is proper to call attention to the regulation of temperature for the reason that some grades of coal contain ashes which fuse at very low temperatures and for such coals it is desirable to limit the temperature at the bottom of the burner and thereby prevent the vaporization of the ash, which notwithstanding the forcible centrifugal action to which all of the products are subjected might result in permitting such vapors to be discharged with the flame and to be thereafter condensed by contact with relatively cool surfaces in or about the fire chamber 9.

Further it should be noted that in designing these burners an increase in the diameter thereof admits of the freer egress of the products of combustion. This lessens the time that a given fuel particle and its products remain in the burner and hence effects the ultimate temperature therein. By proportioning the burner height and depth it easily may be adapted to any fuel; and likewise, may be adapted to the burning of any given quality of fuel within a given time. The temperature within the furnace or burner is also to be controlled by varying or proportioning the supplies or feeds of air and fuel.

For the purpose of further indicating that my invention is not limited to a specific structure, I call attention to the fact that by enlarging the burner toward the bottom, more or less as shown in Fig. 32, and in Fig.

16, the need of the overhanging ledge or air-abutment ring 7 may be minimized and if desired the use of such a distinct abutment may be entirely avoided. The enlargement of the furnace toward the bottom affords the relief in that direction as opposed to the upward direction, which latter would permit the air to escape from the burner without first being admixed with the fuel on the hearth. In practically all these burners some of the air may escape directly at the top, but as before indicated it is not necessary that all of the air shall descend to the bottom of the burner.

The crushed or comminuted coal supplied to the hearth of the furnace always contains many fine particles. To start the process into operation it is only necessary to apply a torch or kindling of any suitable kind within the bottom of the burner. Then the air blast is started downward through the top twyers. Instantly an energetic fire is organized, and then the streams of fuel are admitted through the feed twyers 8. The addition of the fine fuel to the fire further augments the latter and within a few minutes the inner walls of the furnace are brought to incandescence and a flame body of size and temperature sufficient to take care of the full supply of fuel is established. It is desirable to construct and organize the several elements of my novel burner in such form and manner that the burners may be cheaply manufactured, easily assembled and easily installed, in fire chambers of all sorts. Further it is desirable that the air which enters the burner shall be brought to a high temperature as quickly as possible. From the standpoint of a burner or furnace, which shall be adapted for use within a limited space, it is desirable that the depth of the burner shall be reasonably shallow. Again, it is desirable that the air which enters the burner shall be caused to whirl therein with the least obstruction to its movement and shall be permitted to attain the highest whirling velocity consistent with the pressure at which it enters, to the end that sufficient centrifugal force shall be developed on the hearth to surely retain the fuel at the periphery thereof and thus prevent loss of fuel either downward through the slag hole or upward with the central body of flame. For the concurrent attainment of these objects and conditions I preferably employ an air twyer construction which divides the air supply into a great number of thin sheets or streams that are disposed tangentially to the body of the burner and are substantially parallel to the axis thereof. The thin streams or sheets thus entering the burner lap one over the other and circle within the burner, constituting a large number of thin walled annuli of substantially the same radius and diameter and all moving downward upon the hearth. The organization and preservation of the supplied air in this form of a thin walled annulus, obviously serves to ideally present the air for the rapid reception of the heat of the central column of flame, the heat being received directly therefrom and from the hot surfaces against which the air scrubs. The rapid heating of the air being assured, it follows that its vertical movement or path within the burner, may be shortened, and the burner as a whole may be proportionately of less depth than a burner of the kind shown in Figs. 32 and 33. And, as an exact centrifugal control of the whirling air must needs result in causing the lower end of the continuous column of air to descend upon the hearth at a maximum whirling velocity, it follows that the particles of coal on the hearth will not only be certain to be set into rotation thereon, but that such movement will be maintained at velocities that develop in such particles sufficient centrifugal force to hold them at the periphery of the hearth, against the inward pushing forces of the air and gases that react inwardly and upwardly from the hearth, and thus the escape of fuel at the slag hole is prevented.

Figs. 1 to 5 illustrate one such twyer construction and the effect which it has upon the general construction of the burner or furnace. This twyer construction comprises a ring or annulus that is made up of a large number of upright metal blades, vanes or flights, 11, separated by narrow slits or spaces 12, all inclined or curved in the same direction; and all, as nearly as feasible, at true tangents to the inner periphery of the ring which they constitute. Practically the height of the vanes and hence the height of the tangential twyer ring as a whole, is substantially the same as the height of the surrounding pressure-air trunk 13. The latter is of sufficient capacity to insure a substantially uniform pressure at each of the elongated narrow slits of twyers proper 12, and, of necessity, the air passing inwardly through the twyers is organized into the described thin walled air column whirling at such velocity and with such centrifugal force as to bank against the inner periphery of the twyer ring, and to forcibly seek escape at the top and bottom thereof. At the top, escape is cut off by the overhanging abutment ring or ledge 14. At the bottom its escape is permitted, for there the descending whirling column directly enters the top of the bowl-like hearth 15 and through many whirling motions finally approaches the axis of the burner and finds relief upwardly through the open top of the burner; or in other words, is permitted to escape upwardly through the continuously maintained hollow annulus of air at the twyers. By these steps the above defined purposes are accomplished with the desired effects.

The fuel is admitted to the bowl 15 through one or several fuel twyers 16. The actual feeding of the fuel may be done by blasts of air or other gas in the twyer pipes, or it may be fed by any other force, including inspiration and the forces of any suitable mechanical feed mechanism. As before stated, it is only necessary to deliver the fuel upon the hearth. From that moment, it is carried forward and properly distributed by the whirling air and gases within the burner.

My invention is not strictly limited to the burning of coal, but also includes the burning of various fuel oils and gases; both to the end that the process may be worked alternately with such fuels, and to the end that the latter may with convenience be used for starting or kindling the coal fire on the hearth. I have not herein shown large gas twyers such as may be employed at the margin or periphery of the hearth, but as representing both oil and gas feeds have depicted the use of the additional fuel twyers 17, the same appearing in Figs. 1, 3 and 4. Obviously, any suitable means may be employed to supply or feed the fuel to such alternative or additional twyers.

Except as hereinabove noted, the process as practiced in a burner of the construction of Figs. 1 to 5 does not differ from the practice with burners of the kind shown in Figs. 32 and 33, and therefore it seems unnecessary to here repeat the description of the elementary steps of the process as specifically related to a comparatively shallow burner of the kind identified by the described twyer ring.

The trunk 13 leading to and surrounding the twyer ring may be subdivided in different ways to suit special uses of that ring and the burner.

Further novel elements and features of the burner shown in Figs. 1 to 5 comprise the following: The air trunk is composed of metal channels 18, a bottom plate, 19, and a top plate, 20. The top and bottom merge with the flanges of the channels, 18, to form circular openings which are occupied by the bottom ring, 21, and the top ring, 22, respectively bolted to the bottom and top parts of the trunk. The twyer ring is held between the parts 21 and 22. Upon the removal of the part 22, the twyer ring may be lifted out of the burner strucure, as well shown in Fig. 5. The shell or pan, 23, containing the bowl-like refractory hearth, 15, has its top flange bolted or riveted to the bottom of the trunk 13. It should be observed that the ring 21 is secured by bolts, so that it may be removed when it is desired to place a new firebrick lining or hearth in the pan 23. In practice, the hearth is composed of sector-like brick 15', with separate bricks, 15'', forming the slag hole. The part 24 below the central slag hole is lined with firebrick and is a cylindrical reflector that assists in retaining the margin of the slag hole at a temperature that prevents the chilling of the slag thereon. The burner is held in position by suitable supports, 25, and preferably these constitute rails upon which the burner may be moved, to slide it out of the furnace structure through a door opening, 26, of which 26' is the door or closure. The inwardly extending edge, 22', of the ring 22 may constitute the actual air column abutment ring of the burner to save the marginal portions of the top firebrick, 27. As illustrated in Fig. 2, the top brick 27 are of sector-like shape, together constituting a ring which is set within an opening, 28, in the floor, 29, of the fire chamber, 9'. The top of the ring 22 is preferably formed with annular flanges, 22'' which serve to support the bricks, 27, in the inclined position illustrated, in which position they constantly tend to settle together and thus tightly close the cracks between them. A suitable packing, 30, of fire clay or the like, is used between the ring 22 and the brick 27. The holes, 33, in the floor, 29, establish constant communication and therefore a pressure balance between the fire chamber, 9', and the slag pit, 34, beneath the burner. This balance of pressure in the chambers above and below the burner, prevents the flow of cold air or gases upward from the slag pit, 34, and through the slag hole of the burner, which if permitted would tend to chill the liquid slag and close that hole. It only remains to state that the metal shell or jacket of the hearth provides convenient anchorages, 35 and 35' for the several fuel twyers. The other mechanical features disclosed in Figs. 1 to 5 are made clear thereby and do not require special description.

The use of fire brick to form the abutment ring of the burner may be avoided by the very simple expedient illustrated in Fig. 6. As there shown, the top brick, 36, and the top 37, of the air trunk, 38, are only as wide as required to cover the top edge of the twyer ring, 39. The abutment is formed by the intermediate ring, 40, which is of metal, and preferably integral with the vanes of the twyer ring 39. The structure is better shown in the perspective view, (Fig. 7) which also discloses the top and bottom heads, 41 and 42, to which the several vanes 39' are attached. With this construction, air is tangentially projected into the burner both above and below the metal abutment ring, 40; a proceeding which somewhat benefits the combustion of the gases above the burner, and, more importantly, prevents the burning of the metal abutment ring 40. As suggested in Fig. 6, the shell portion, 47, for the hearth of the burner may be formed integrally with the upright walls, 48, of the air trunk, 38. The construction of the bottom ring, 49, remains substantially as before described. In the structure of Fig. 6, the fuel twyers, 50, may likewise be made integral with the main casting; and the coal twyers, 50, may directly receive the oil feed pipes, 51.

Another construction which may be substituted for a firebrick abutment ring is that illustrated in Fig. 8, wherein the top ring or part 43 of the air trunk is supplemented by an underlying ring, 44 spaced away therefrom to form an annular, radial air chute or passage, 45, directly above the top of the twyer ring, 46. The inwardly projecting edge 44' of the ring 44 obviously forms the air column abutment ring of the burner.

In Fig. 9 I have illustrated tangential coal twyers, 52, and oil twyers, 53, in contrast to the radial twyers, 16 and 17 on Fig. 1. They resemble the coal twyers 8 of Figs. 32 and 33 and operate in the same manner.

Figs. 10, 11, 13 and 15, illustrate burners which are distinguished by whirling-fuel grooves, 54, which underlie the bottoms, 55, of respective air trunks, and hence directly underlie the lower ends of respective air twyers 56. These constructions assist in the retention of the fuel particles at the outer margins or peripheries of respective hearths.

Fig. 10 also illustrates a modified construction of the air trunk and a modified construction of the hearth shell, 57, the upper wall of which is directly exposed to the fire on the hearth. The hearth, 58, in this case is a mere circular slab of firebrick resting on grouting, 59, in the bottom of the shell. The margin of the slag hole, 60, is formed preferably of a separate brick or bricks, 61. The latter feature will be seen to persist throughout Figs. 10 to 16.

In Fig. 11 I have illustrated a form of fuel twyer, 62, which descends through the air trunk, 63, and penetrates the inclined top, 55', of the plate, 55. 64 represents the oil feed pipe entering the twyer 62.

Fig. 12 illustrates a desirable hoppering, 65, of the bottom of the air trunk, 66, for the accommodation of the twyer ring and for the better accommodation of the underlying fuel twyers, 67. The hearth, 68, of this construction resembles the hearth, 58, of Fig. 10.

In Fig. 13 I have illustrated an inspirator type of fuel twyer, 69, communicating with the hearth. This twyer is positioned in the air trunk, 70, and receives pressure air through the inspirating opening, 71, directly from the air trunk 70. This construction prevents the clogging of the nozzle of the twyer and assists or may be relied upon for the feeding of the fuel through the communicating fuel pipe, which it will be understood is attached to the outer end of the twyer 69.

In Fig. 14 I have illustrated a combined shell and trunk construction made of three parts, 72, 73 and 74, the latter being a suitably shaped plate upon the edges of which parts 72 and 73 are bound a large number of clamping bolts, 75. In such cases the twyer ring 76 is conveniently stepped or seated directly upon the top of the refractory hearth 77. A similar construction is illustrated in Fig. 15, but in this case the trunk comprises the parts 55, 78 and 79, bound together by clamping bolts, 80, and the shell, 81, is a separate part also engaged by the clamping bolts, 80. In the latter figure of the drawing I have also illustrated another form of inspirator twyer, the same comprising the coal pipe nozzle, 82, which descends into the hearth, 83, and which is supplied with pressure air through the annular opening, 84, in the floor, 55, of the air trunk.

It is to be understood that any number of the described fuel twyers, of any selected type, may be used with the burner. Fig. 16 has already been referred to as suggesting a substitute construction for the preferred overhanging abutment ledge or ring. The latter is substituted by a twyer ring, 85, in the form of a truncated cone. The other details of Fig. 16 do not seem to require special explanation as they will be clearly understood therefrom.

It is obvious that the vanes, flights or blades of the twyer ring may be many different cross-sections and arrangements. I have employed Figs. 17 to 31 to accentuate this fact. Figs. 17 to 21 are also intended to represent structures in which the blades or vanes are connected to endless top and bottom rings 86, (see Fig. 21); whereas Figs. 22 to 31 are intended to represent a sectional twyer ring, each twyer ring being composed of a large number of identical blades, which latter may be of any one of many different shapes. Throughout Figs. 17 to 31 the blades proper are marked 87 irrespective of the individual shapes thereof, this method of identifying blades being resorted to for the purpose of better noting the fact that they may be of many different shapes so long as only one shape is used in any given twyer ring. It is rarely desirable to modify the formation of the blade in either the upper or lower portions of the twyer ring, though obviously such modifications may be made without departing from the invention or nullifying the functions of the twyer ring.

My invention as reflected in Figs. 22 to 31 is particularly advantageous in that the adoption of a single twyer blade of a standard form and size leads to the standardization of the twyer ring as a whole, inasmuch as the latter is composed of a multiplicity of such standard blades or vanes. The spacing heads, 88, of these blades are formed to properly interlock, and together constitute respective top and bottom ends or rings of the twyer ring as a whole. Obviously the interlocking shapes of the heads 88 may take many different forms. Several such are clearly represented in Figs. 23 and 24, and 28 to 31. Those figures so clearly represent the invention that they do not require individual description. The blade portion proper (of any form selected) remaining the same; the only modification required for the construction of twyer rings of different diameters is that which consists in properly shaping the ring sections or heads, 88, so that they will correspond to the given radius of the ring. After the blades or twyer sections have been set up in ring formation, they are bolted or bound together in any suitable manner, either by direct through-bolts, (not shown) or by encircling bands, 89 or 90, as shown in Figs. 25 and 26 respectively, or by ring-like sectional straps, 91, as shown in Fig. 27. The latter are particularly applicable to twyer sections or blades which have integral intermediate lugs, 92 and 93; the former, as will be apparent, being utilized to form such an air column abutment ring as is illustrated at 40 in Fig. 6. By preference, I make the twyer blades of cast iron, as that metal is best adapted to retain its shape against the warping effect of the intense heat which the twyer ring receives from interior of the burner.

It is particularly to be noted that I have herein fully disclosed a successful combined coal and oil burner, an apparatus long wanted for many uses and in many industries. When only oil is to be burned the central slag hole may be closed, as there is no particular residue to be discharged; but the slag hole should always be left open when the burner is to be used with a mixture of coal and oil, or with coal alone, or alternatively with coal and oil, where alternative operation includes the use of oil for the stand-by maintenance of the burner in hot condition, ready at any time to receive a feed of coal.

As various other modifications of my invention will readily suggest themselves to one who is skilled in the art, I do not restrict or limit the same to the structures herein specifically shown and described.

Having thus described my invention, I claim as new and desire to secure by Letters Patent:—

1. The herein described improvement in furnaces that consists in an upright annulus having tangential air admission twyers at its top, means to cause the air to descend therefrom, a tangential fuel admission twyer above the bottom of said annulus and so far below said air twyers as to insure the pre-heating of the air before its admixture with the fuel.

2. The herein described improvement in furnaces that consists in an upright annulus having tangential air-sheet admission twyers at its top, and means to cause the air to descend therefrom, and having one or more tangential fuel admission twyers above the bottom of said annulus and below said air twyers.

3. The herein described improvement in furnaces that consists in an upright annulus having tangential air-sheet admission twyers substantially parallel to the axis of the annulus and located in the upper part of said furnace, means to cause the air to descend therefrom, and one or more tangential fuel admission twyers above its bottom and below said air twyers.

4. The fuel burner herein described comprising a refractory bowl-like hearth having a central slag discharge opening, in combination with a pressure-air admission trunk and a metallic multiple twyer ring forming the outlet of said trunk and shaped to direct the air tangentially within itself in the form of a hollow cylinder that is substantially co-axial with said hearth, means causing said cylinder of air to move downward upon said hearth and means for feeding fuel upon said hearth.

5. The fuel burner herein described comprising a refractory bowl-like hearth having a central slag discharge opening, in combination with a pressure-air admission trunk and a metallic multiple twyer ring forming the outlet of said trunk and shaped to direct the air tangentially within itself in the form of a hollow cylinder that is substantially co-axial with said hearth, means causing said cylinder of air to move downward upon said hearth and means for simultaneously and alternatively feeding different fuels upon said hearth.

6. The herein described improvement in furnaces, that consists in an upright annulus chiefly composed of vertically elongated tangential twyers, in combination with a refractory hearth below said twyers, and, means between said twyers and the bottom of said hearth for feeding fuel upon the latter.

7. The herein described improvement in furnaces, that consists in an upright annulus chiefly composed of vertically elongated, tangential twyers, in combination with an annular abutment of lesser diameter at the top of said annulus, a refractory hearth below said annulus, and forming a bowl-like bottom therefor, and means positioned between said twyers and the bottom of said hearth for feeding fuel through the side wall of the hearth.

8. The herein described improvement in furnaces, that consists in an upright annulus, chiefly composed of vertical, tangential twyers, in combination with an annular abutment of lesser diameter, at the top of said annulus, a refractory hearth below said annulus and forming a bowl-like bottom therefor, fuel feeding means between said annulus and the face of said hearth, and said hearth containing a slag discharge hole.

9. The herein described improvement in furnaces, comprising an upright annulus, chiefly composed of vertically elongated tangential twyers, in combination with an air feeding trunk enclosing said annulus, a refractory hearth forming a bowl-like bottom for said annulus, a means for feeding fuel to the periphery of said hearth, and, said hearth having a central slag discharge hole.

10. The herein described improvement in fuel burners of the centrifugal type including means to cause the air for combustion to move downwardly and be positively preheated before being admixed with the fuel, comprising an upright chamber which is open at the top and substantially closed at the bottom, in combination with a twyer for injecting fuel through an upright wall of said chamber at a point above said bottom, a plurality of air admission twyers entering said chamber tangentially and above the fuel twyer, and said bottom having a central slag discharge hole.

JOSEPH MARTIN SCHUTZ.